United States Patent
Gustavsson

(10) Patent No.: US 7,562,904 B2
(45) Date of Patent: Jul. 21, 2009

(54) VIBRATION CONTROL DEVICE PROVIDING A DESIRED VIBRATION CHARACTER IN A STEERING WHEEL OF A VEHICLE

(75) Inventor: Mats Gustavsson, Helsingborg (SE)

(73) Assignee: A2 Acoustic AB, Linköping (SE)

( * ) Notice: Subject to any disclaimer, the term of this patent is extended or adjusted under 35 U.S.C. 154(b) by 13 days.

(21) Appl. No.: 10/594,931

(22) PCT Filed: Mar. 23, 2005

(86) PCT No.: PCT/SE2005/000441

§ 371 (c)(1), (2), (4) Date: Sep. 29, 2006

(87) PCT Pub. No.: WO2005/095180

PCT Pub. Date: Oct. 13, 2005

(65) Prior Publication Data

US 2007/0216123 A1 Sep. 20, 2007

(30) Foreign Application Priority Data

Apr. 1, 2004 (SE) .................................... 0400878

(51) Int. Cl.
*B62D 1/16* (2006.01)
(52) U.S. Cl. .................................................... 280/779
(58) Field of Classification Search ............... 280/779, 280/775; 74/492; 180/337, 338
See application file for complete search history.

(56) References Cited

U.S. PATENT DOCUMENTS

| | | | | |
|---|---|---|---|---|
| 5,360,080 A | * | 11/1994 | Yamazaki | .................... 180/300 |
| 5,386,372 A | * | 1/1995 | Kobayashi et al. | .......... 700/280 |
| 5,629,986 A | | 5/1997 | Shoureshi | |
| 5,768,124 A | | 6/1998 | Stothers et al. | |
| 6,150,733 A | | 11/2000 | Podszun et al. | |
| 6,715,045 B2 | * | 3/2004 | Braun et al. | ................. 711/154 |
| 6,761,243 B2 | * | 7/2004 | Stout et al. | ................... 180/402 |

(Continued)

FOREIGN PATENT DOCUMENTS

DE   10226477 A1   2/2004

(Continued)

OTHER PUBLICATIONS

PCT/ISA/210—International Search Report.

(Continued)

*Primary Examiner*—Faye M. Fleming
(74) *Attorney, Agent, or Firm*—Venable LLP; Eric J. Franklin

(57) ABSTRACT

A device for motor vehicles and a motor vehicle. The motor vehicle includes a support structure, which is mounted in the vehicle, and a steering wheel, which is rotatably connected to the support structure. The device includes a control unit and a sensor device, which is connected to the control unit. The sensor device is adapted to sense vibrations in the steering wheel and to provide a sensor signal related to the sensed vibrations. An actuator device is connected to the control unit and adapted to influence vibrations in the vehicle. The control unit is adapted to control the actuator device, with regard to the sensor signal, to act on the vehicle in such a way that a desired vibration character in the steering wheel is obtained.

20 Claims, 3 Drawing Sheets

U.S. PATENT DOCUMENTS

| | | | |
|---|---|---|---|
| 6,968,261 B2 * | 11/2005 | Ghoneim et al. | 701/41 |
| 7,226,082 B2 * | 6/2007 | Muramatsu et al. | 280/775 |
| 7,269,485 B2 * | 9/2007 | Oikawa et al. | 701/1 |
| 2002/0130533 A1 | 9/2002 | Hartel et al. | |
| 2005/0049761 A1 * | 3/2005 | Kataoka et al. | 701/1 |
| 2005/0173915 A1 | 8/2005 | Stich | |
| 2006/0113937 A1 * | 6/2006 | Hidaka et al. | 318/432 |
| 2006/0284839 A1 * | 12/2006 | Breed et al. | 345/156 |

FOREIGN PATENT DOCUMENTS

| | | | |
|---|---|---|---|
| EP | 0778559 A2 | 6/1997 | |

OTHER PUBLICATIONS

PCT/IB/326—Notification Concerning Transmittal of Copy of International Preliminary Report on Patentability (Chapter of the Patent Cooperation Treaty).

PCT/ISA/237—Written Opinion of the International Searching Authority.

PCT/IB/373—International Preliminary Report on Patentability.

\* cited by examiner

VIBRATION CONTROL DEVICE PROVIDING A DESIRED VIBRATION CHARACTER IN A STEERING WHEEL OF A VEHICLE

CROSS-REFERENCE TO RELATED APPLICATIONS

This application claims priority to Swedish patent application 0400878-5 filed 1 Apr. 2004 and is the national phase under 35 U.S.C. § 371 of PCT/SE2005/000441.

THE BACKGROUND OF THE INVENTION AND PRIOR ART

The present invention refers generally to vibration control in motor vehicles, such as cars, busses, trucks etc. More specifically, the invention refers to a device for motor vehicles having a support structure adapted to be mounted in the vehicle and a steering wheel, which is rotatably connected to the support structure, wherein the device includes a control unit, a sensor device, which is connected to the control unit, wherein the sensor device is adapted to sense vibrations in the steering wheel and to provide a sensor signal related to the sensed vibrations, and an actuator device, which is connected to the control unit and adapted to influence the vibrations in the vehicle.

The present invention also refers to a device for a motor vehicle, including a support structure adapted to be mounted in the vehicle, a steering wheel rotatably connected to the support structure, a control unit, a sensor device, which is connected to the control unit, wherein the sensor device is adapted to sense vibrations in the steering wheel and to provide a sensor signal related to the sensed vibrations, and an actuator device, which is connected to the control unit and adapted to influence vibrations in the vehicle.

Furthermore, the present invention refers to a motor vehicle including a support structure mounted in the vehicle, a steering wheel, which is rotatably connected to the support structure, and a device, wherein the device includes a control unit, a sensor device, which is connected to the control unit, wherein the sensor device is adapted to sense vibrations in the steering wheel and to provide a sensor signal related to the sensed vibrations, and an actuator device, which is connected to the control unit and adapted to influence vibrations in the vehicle.

Such motor vehicles usually include a support structure, which is designed as a support beam extending in the vehicle transversely to the longitudinal driving direction of the vehicle and between the two sides of the vehicle, and more specifically between the two so-called A-posts, i.e. the post-like elements extending upwardly between the front shield and a respective forward door of the vehicle. This support beam has many functions, for instance to support different components such as the steering column, the dashboard, units for controlling ventilation and air conditioning, etc. As the most essential support components in the vehicle, this support structure is subjected to dynamic loads causing vibrations. There are normally several sources for dynamic loads, such as the engine of the vehicle, the contact to the road on which the vehicle is running, and various mechanical drive members. The vibrations present in the support structure propagate via the steering column to the steering wheel of the vehicle. Steering wheel vibrations may be experienced by the driver as monotone and irritating, which for instance is the case with at least a part of the vibrations from the engine. Certain of the steering wheel vibrations may however be desirable at least to a certain extent. This is perhaps the case especially for vibrations generated by the road and which contribute to transfer road feeling and contact to the road, which is demanded by many drivers and which many drivers regard as an important component for increasing the driving experience and also for increasing the driving security.

US 2002/0130533 discloses a support beam extending between the A-posts of a motor vehicle. The support beam is arranged to carry a plurality of different vehicle components, such as a steering column, air conditioning, ventilating members, heating members, air bags, a centre console, a fuse box, a glove compartment, etc. The support beam includes piezo elements including both a sensing function and a vibration-generating function, the piezo elements are located at the two opposite ends of the support beam, in a central area of the support beam and at the attachment of the steering column to the support beam. The purpose of this construction disclosed in this previously published application is to provide an improved support beam.

SUMMARY OF THE INVENTION

The object of the present invention is to provide a desired vibration character in the steering wheel of a motor vehicle by controlling the vibrations arising in the steering wheel.

This object is obtained by the device initially defined, which is characterized in that the control unit is adapted to control the actuator device, with regard to the sensor signal, to act on the vehicle in such a way that a desired vibration character in the steering wheel is obtained.

By such a device, which senses the vibrations in the steering wheel and, with regard to these vibrations, acts on the vibrations in the steering wheel, it is possible to obtain a desired vibration character in the steering wheel by the control unit defined. For instance, by means of the control unit such an influence on the vibrations may be provided that substantially no engine vibrations, i.e. continuously acting vibrations at a substantially constant frequency, arises whereas vibrations from the road, for instance vibration with an impulse character, are permitted to be transferred to the steering wheel. Such a device may be manufactured as a separate unit and mounted in substantially all motor vehicles present on the market for obtaining such a desired vibration character.

According to an embodiment of the invention, the device includes a reference sensor, which is connected to the control unit and adapted to sense vibrations outside the support structure for providing a reference signal to the control unit. Such a reference sensor, sensing the vibrations in the vehicle outside the support structure may thus provide a reference signal which reflects in a direct and quick manner the vibrations of the engine and/or the wheel hubs, for instance. The reference signal may thus give the control unit a warning about which vibrations will arise in the steering wheel. The direct reference signal may be substantially free from feedback from the actuator device defined. By means of such a reference signal, the stability of the device may be improved since it makes it possible to treat selectively vibrations which are and which are not, respectively, correlated to the reference signal. By means of the reference signal, it is also possible to determine, by means of the control unit, which vibrations are to be suppressed and which are possibly to be transferred to the steering wheel or possibly to be amplified. Advantageously, the reference sensor may include a first reference sensor element arranged to sense engine-excited vibrations and a second reference sensor element arranged to sense road-excited vibrations. By the use of multiple reference sensor elements it is possible to increase the capability of controlling the vibration character. Both in the case with several reference sensor elements and in the case with one reference sensor element it is possible by the use of for instance a filtered, reference-based gradient method to control the vibrations towards a desired character. For instance, engine speed correlated vibrations may be filtered by the use of a reference sensor element on the driving engine and minimizing part in a control algorithm of the control unit. Furthermore, it is possible to leave transient vibrations from the road uninfluenced by a relatively slow updating of the filter coefficients of the adapted filter of the control unit, which generates actuating signals to one or several actuating elements of the actuator device. It is also possible to control durable front wheel vibrations to a desired level by a set point-controlled part in the control algorithm by means of a reference sensor element in the proximity of the front wheel hubs.

According to a further embodiment of the invention, the sensor device includes at least one sensor element adapted to be mounted on the steering wheel. In such a way, the vibrations arising in the steering wheel may be sensed directly and quickly. Such a sensor element, which is directly mounted on the steering wheel, also reduces the risk of possible errors. However, it is to be noted that the sensor device, as an alternative or supplement, may include one or several sensor elements mounted in another position then directly on the steering wheel. For instance, the sensor device may include at least a further sensor element adapted to be mounted on the support structure.

According to a further embodiment of the invention, the actuator device includes at least one actuating element adapted to be mounted and act on the support structure. Since the vibrations arising in the steering wheel are transferred via the support structure, such an actuating element acting directly on the support structure may in an efficient and reliable manner contribute to the desired vibration character in the steering wheel.

According to a further embodiment of the invention, the support structure includes a support beam extending in an axial direction transversally to a longitudinal driving direction of the vehicle, wherein the actuator device includes at least one actuating element adapted to be mounted and act on the support beam. Advantageously, also said further sensor element may be adapted to be mounted on the support beam.

According to a further embodiment of the invention, the support beam has a periphery, wherein the actuator device includes at least two actuating elements which are adapted to be mounted around the periphery with an angle distance between each other. By means, of several such actuating elements on the outer periphery of the support beam, it is possible to apply forces counteracting or amplifying vibrations in the support beam along various directions. It is especially advantageous to let the actuator device include three such actuating elements around the periphery. Advantageously, the actuating elements are uniformly distributed around the periphery. If the support beam has a circular cross-section, the angle distances between adjacent actuating elements are equal. If the support beam has another cross-section, the angle distance between adjacent actuating elements may be adapted so that an optimal force distribution between the actuating elements is achieved. Furthermore, the actuating elements are advantageously provided at substantially the same axial position. The actuator device may also include several sets of actuating elements, each of which sets includes for instance three actuating elements provided at substantially the same axial position and with the same angle distance between adjacent actuating elements. Furthermore, the actuator device may be adapted to introduce a bending moment to the support beam.

According to a further embodiment of the invention, the steering wheel is connected to a steering column, wherein the actuator device includes at least one actuating element adapted to be mounted and act on the steering column. Also the steering column may have an outer periphery with at least one set of actuating elements, which includes for instance two or three actuating elements provided at substantially the same axial position with regard to the longitudinal axis of the steering column and with the same angle distance between adjacent actuating elements. Furthermore, the actuator device may be adapted to introduce a bending moment to the steering column.

According to a further embodiment of the invention, the control unit includes an adaptive filter which is adapted to generate an actuating signal supplied to the actuator device for said influence on the vibrations in the vehicle. Advantageously, the reference sensor is connected to the adaptive filter and arranged to supply the reference signal to the adaptive filter, wherein the reference signal forms the basis for the actuating signal. The sensor device may then be arranged to supply the sensor signal to the adaptive filter for updating the adaptive filter. Furthermore, the control unit may include a prefilter, which is connected to the reference sensor and arranged to provide a filtered reference signal. The control unit may also include a control algorithm, which is located between the sensor device and the adaptive filter and arranged to filter the sensor signal supplied to the adaptive filter. Advantageously, the prefilter is connected to the control algorithm for the supply of the filtered reference signal to the control algorithm.

The object is also achieved by the device initially defined, which is characterised in that the control unit is adapted to control the actuator device, with regard to the sensor signal, to act on the vehicle in such a way that a desired vibration character in the steering wheel is obtained. Such a device, which includes the support structure and the steering wheel, constitutes an essential component that can be provided and mounted in substantially all motor vehicles available on the market during the manufacturing of the vehicle, or as auxiliary equipment to be mounted afterwards.

The object is also achieved by the motor vehicle initially defined, which is characterised in that the control unit is adapted to control the actuator device, with regard to the sensor signal, to act on the vehicle in such a way that a desired vibration character in the steering wheel is obtained. Advantageous embodiments of this motor vehicle is obtained by means of the features of the device.

BRIEF DESCRIPTION OF THE DRAWINGS

The present invention is now to be explained more closely by means of a description of various embodiments and with reference to the drawings attached hereto.

DETAILED DESCRIPTION OF VARIOUS EMBODIMENTS

Figure 1:
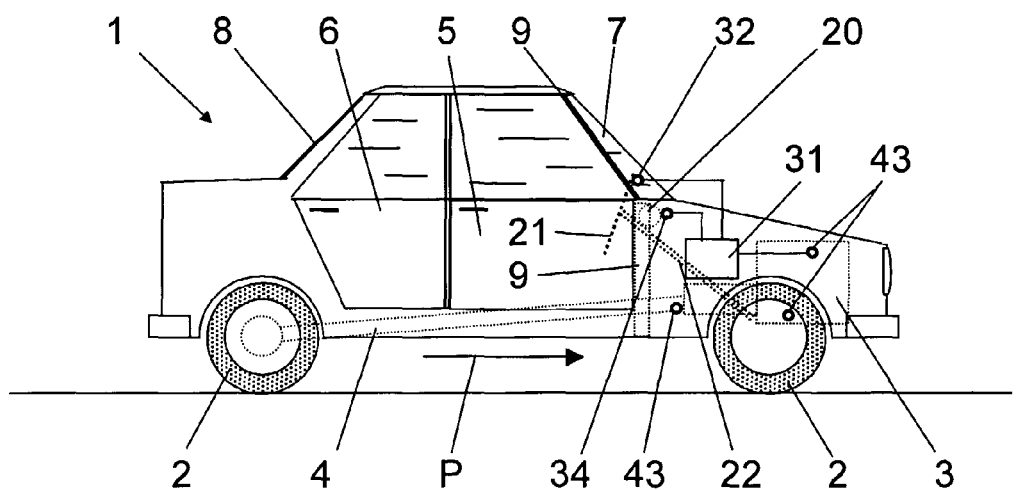
FIG. 1 discloses schematically a sideview of a motor vehicle with a device according to the invention.

FIG. 1 discloses schematically a motor vehicle 1 in the form of a car. The vehicle 1 includes in a manner known per se a chassis with four wheels 2 and a drive package including an engine 3 and a power transmission 4 from the engine 3 to the wheels 2 used for driving the vehicle 1 in a longitudinal driving direction P. The vehicle 1 also includes in a manner known per se two forward doors 5, two rearward doors 6, a front shield 7 and a rear shield 8. Furthermore, the vehicle 1 includes two so-called A-posts 9, which extend from a downward position upwardly on a respective side of the vehicle 1 between a respective forward door 5 and the front shield 7, see FIGS. 1 and 2. In the same way, two so-called C-posts (not explicitly disclosed) extend from a downward position upwardly on a respective side of the vehicle 1 between a respective rearward door 6 and the rear shield 8, and two so-called B-posts (not explicitly disclosed) from a downward position upwardly on a respective side of the vehicle 1 between a respective forward door 5 and a respective rearward door 6.

Furthermore, the vehicle 1 includes a support structure extending between the two sides of the vehicle 1. The support structure includes in the embodiment disclosed a support beam 20, which extends between the two A-posts 9 in an axial direction A transversally to the longitudinal driving direction P. The support beam 20 may have various cross-sectional shapes. In the embodiment disclosed, see FIG. 3, a support beam 20 with a circular cross-section is exemplified. Other possible cross-sections are for instance oval, rectangular, polygonal, U-shaped etc. It is also to be noted that the support beam 20 may have different cross-sections along the axial direction A. The support beam 20 is arranged to support and carry equipment and components of various kinds, for instance a steering wheel 21 for steering the vehicle 1 via a steering column 22 in a manner known per se. The steering wheel 21 and the steering column 22 are then rotatably connected to the support beam 20. Furthermore, the support beam 20 is arranged to support and carry a dashboard 23, units 24 for controlling ventilation and air conditioning, air outlets 25, a glove compartment 26, a centre console 27, airbags (not disclosed), a fuse box (not disclosed), a sound unit (not disclosed) etc.

The vehicle 1 also includes a device for influencing vibrations in the vehicle 1. The device includes a control unit 31, a sensor device 32, a reference sensor 33 and an actuator device 34. The sensor device 32, the reference sensor 33 and the actuator device 34 are connected to the control unit 31.

The sensor device 32 is adapted to sense vibrations in the steering wheel 21 and to provide a sensor signal related to the sensed vibrations, i.e. substantially all vibrations in the steering wheel 21.

The reference sensor 33 is adapted to sense vibrations in the vehicle 1 outside the support structure, i.e. outside the support beam 20 and the steering wheel 21, for providing a reference signal to the control unit. The reference sensor 33 may for instance include a reference sensor element 43 mounted on the engine 3, a reference sensor element 43 on the power transmission 4 and/or a reference sensor element 43 mounted in connection to the wheel suspension of the vehicle 1, wherein each reference sensor element 43 provides a respective reference signal. The reference sensor element 43 or elements 43 may be realized by means of piezo-electric elements.

The control unit 31 is adapted to control the actuator device 34 to influence vibrations in the vehicle 1, and more precisely to act on the vehicle 1 in such way that a desired vibration character in the steering wheel 21 is obtained.

Figure 2:
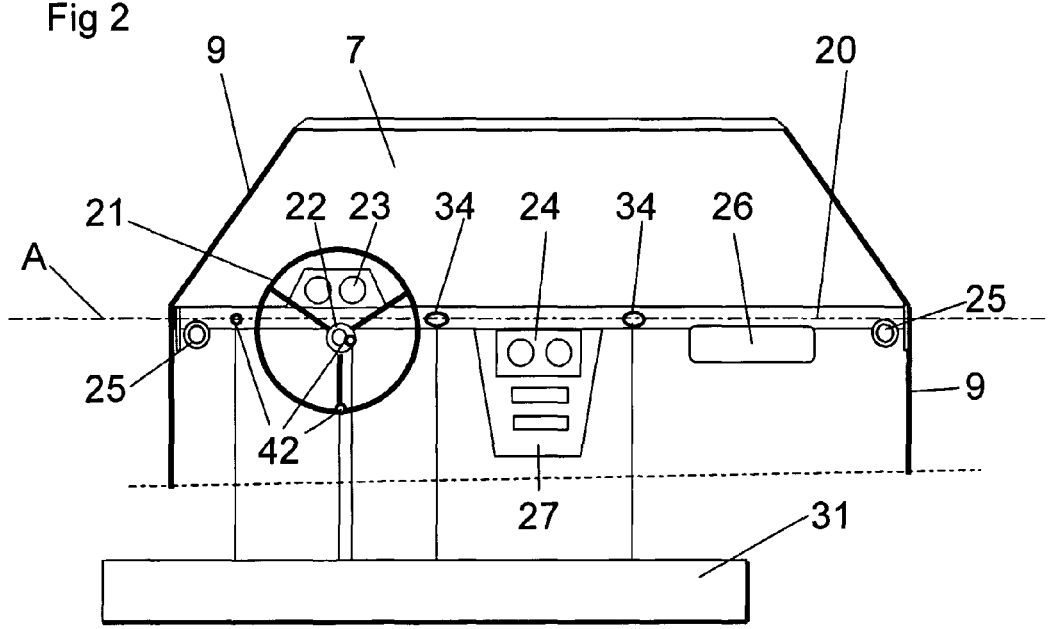
FIG. 2 discloses schematically a rear view of a support structure of the vehicle with mounted equipment.

The sensor device 32 includes at least one sensor element 42, which is mounted on the steering wheel 21, see FIG. 2. The sensor device 32 may also include at least a further sensor element 42, which is mounted on the support structure, for instance on the support beam 20, or on the steering column 22, see FIG. 2. Each sensor element 42 provides a respective sensor signal. Also the sensor elements 42 may be realized by means of piezo-electric elements.

The control unit 31 is adapted to take the sensor signal or signals from the sensor device 32 into consideration. In a simple embodiment, the actuator device 34 may be controlled solely by means of the sensor signal or signals. In a more advanced embodiment, the actuator device 34 is controlled with regard to both the sensor signal/s and the reference signal/s.

Figure 3:
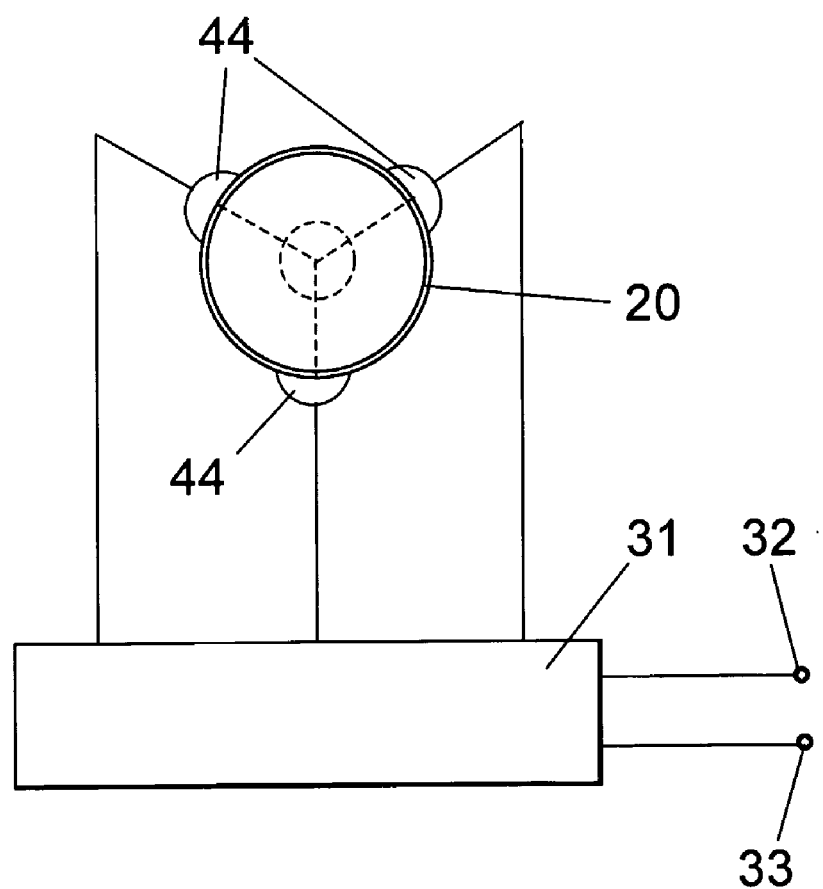
FIG. 3 discloses schematically a sectional view through a support beam of the vehicle.

The actuator device 34 includes at least one actuating element 44, which is mounted and act on the support structure, especially on the support beam 20. The actuator device 34 includes advantageously a set of several such actuating elements 44, for instance two, three, four or more actuating elements 44. FIG. 3 discloses such a set with three actuating elements 44, which are uniformly mounted around the outer periphery of the support beam 20 with an angle distance between each other. In the embodiment disclosed, the angle distance between adjacent actuating elements 44 is equal, i.e. in this example 120°. The actuating elements 44 in the set are furthermore provided at substantially the same axial position along the direction A. The actuating device 34 may include several such sets with three actuating elements mounted on the periphery of the support beam 20, for instance a set to the left of the steering column 22 and two sets to the right of the steering column 22. The actuator device 34 may also include at least one actuating element 44 or a set of actuating elements 44 which are mounted and acts on the steering column 22. These actuating elements 44 may for instance also be uniformly distributed around the periphery of the steering column 22. Also the actuating elements 44 may be realized by means of piezo-electric elements. Each actuating element 44 has a longitudinal extension and is adapted to alternately vary the length of the actuating element 44 in the direction of the longitudinal extension. Each actuating element 44 is thus expandable and compressible along the longitudinal extension. The actuating elements 44 are preferably mounted to the support beam 20 and the steering column 22, respectively, in such a way that the direction of the longitudinal extension of the actuating elements is parallel to longitudinal direction of the support beam 20, i.e. the direction A, and to the longitudinal direction of the steering column 22, respectively. The support beam 20 and the steering column 22, respectively, will thus perform an alternately varying change of the length, or an alternately bending movement.

Figure 4:
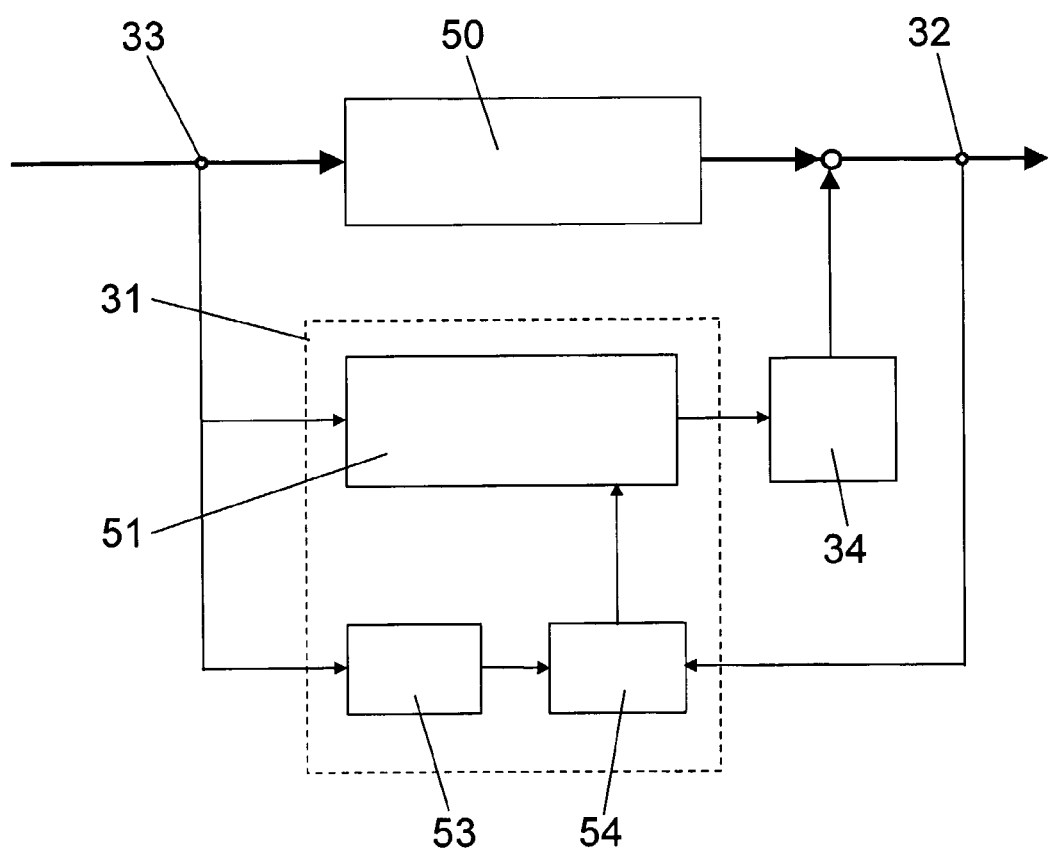
FIG. 4 discloses a block diagram of the device.

FIG. 4 discloses schematically a block diagram of a part of the vehicle 1 and the device for influencing vibrations. The vehicle 1 forms or includes a dynamic system schematically disclosed as a box 50. The control unit 31, which may be realized by means of a calculating unit including a processor and a memory, is disclosed within the dashed box. The control unit 31 includes a number of different functions, which may be realized by means of said calculating unit. Some of these functions are illustrated schematically in FIG. 4, for instance an adaptive filter 51, which is determined by a number of filter coefficients and which is adapted to generate an actuating signal supplied to the actuator device 34 for said influencing on the vibrations in the vehicle 1. More specifically, the adaptive filter 51 generates several actuating signals, i.e. a unique actuating signal for each actuating element 44. Before the actuating signals are supplied to the respective actuating element 44, they may suitably be amplified by means of an amplifier (not disclosed).

The reference sensor 33, or actually the different reference sensor elements 44 is connected to the adaptive filter 51. The reference sensor elements 43 are adapted to feed a respective reference signal to the adaptive filter 51. The control unit 31 includes a prefilter 53, wherein the reference sensor 33 also is connected to the prefilter 53 for filtering the reference signal.

The sensor device 32 is adapted to supply the sensor signal to the adaptive filter 51 for updating the filter coefficients of the adaptive filter 51, and more precisely a sensor signal from each sensor element 42. The control unit 31 also includes a control algorithm 54, which is located between the sensor device 32 and the adaptive filter 51. The control algorithm 54 is arranged to process and filter the sensor signal, or actually the sensor signals from the different sensor elements 42, which then are supplied from the control algorithm 54 to the adaptive filter 51 for updating of the filter coefficients. The prefilter 53 is connected to the control algorithm 54 for the supply of the filtered reference signal to the control algorithm 54.

The function of the device is now to be described by means of an example of a design of the device. During operation, a reference signal, related to engine-excited vibrations are fed from a reference sensor element 43 and a reference signal, related to road-excited vibrations, from a further reference sensor element 43 to the adaptive filter 51. These reference signals form the basis for the various actuating signals. Reference signals are also fed to the prefilter 53 for filtering, and then supplied to the control algorithm 54. The control algorithm 54 also receives the sensor signals, or state signals, from the different sensor elements 42. From the sensor signals and the filtered reference signals, the control algorithm 54 calculates the filter coefficients by means of which the adaptive filter 51 is to be updated. The actuating signals, supplied to the different actuating elements 44 are then generated by means of the updated filter coefficients. The control algorithm 54 may then for instance include an algorithm for minimising the engine-excited vibrations and an algorithm for controlling the road-excited vibrations to a desired level. Furthermore, the control algorithm 54 may be adapted to leave vibrations, which are not correlated to the two reference signals, essentially uninfluenced by means of an adapted updating speed for the adaptive filter 51.

The invention is not limited to the embodiments disclosed but may be varied and modified within the scope of the following claims.

The invention claimed is:

1. A device for motor vehicles comprising an engine, a power transmission, a wheel suspension and a support structure adapted to be mounted in the vehicle and a steering wheel, which is rotatably connected to the support structure, the device comprising:
a control unit,
a sensor device operatively connected to the control unit, wherein the sensor device comprises at least one sensor adapted to be mounted on the steering wheel and adapted to sense vibrations in the steering wheel and to provide a sensor signal related to the sensed vibrations,
an actuator device operatively connected to the control unit and adapted to influence the vibrations in the vehicle, and
a reference sensor operatively connected to the control unit and adapted to sense vibrations outside the support structure to provide a reference signal to the control unit, the reference sensor comprising a first reference sensor element adapted to be mounted on at least one of the engine and the power transmission and arranged to sense engine-excited vibrations and a second reference sensor element adapted to be mounted in connection with the wheel suspension and arranged to sense road-excited vibrations,
wherein the control unit is adapted to control the actuator device, with regard to the sensor signal and reference signal, to act on the vehicle in such a way that a desired vibration character in the steering wheel is obtained.

2. The device according to claim 1, wherein the sensor device includes at least one sensor element adapted to be mounted on the steering wheel.

3. The device according to claim 2, wherein the sensor device includes at least a further sensor element adapted to be mounted on the support structure.

4. The device according to claim 1, wherein the actuator device includes at least one actuating element adapted to be mounted and act on the support structure.

5. The device according to claim 4, wherein the support structure includes a support beam extending in an axial direction transversally to a longitudinal driving direction of the vehicle, wherein the actuator device includes at least one actuating element adapted to be mounted and act on the support beam.

6. The device according to claim 2, wherein said further sensor element is adapted to be mounted on the support beam.

7. The device according to claim 5, wherein the support beam has a periphery, wherein the actuator device includes at least two actuating elements which are adapted to be mounted around the periphery with an angle distance between each other.

8. The device according to claim 7, wherein the actuating elements are uniformly distributed around the periphery.

9. The device according to claim 7, wherein the actuating elements are provided at substantially the same axial position.

10. The device according to claim 5, wherein the actuator device is adapted to provide a bending movement of the support beam.

11. The device according to claim 1, wherein the steering wheel is connected to a steering column, wherein the actuator device includes at least one actuating element adapted to be mounted and act on the steering column.

12. The device according to claim 11, wherein the actuator device is adapted to provide a bending movement of the steering wheel.

13. The device according to claim 1, wherein the control unit includes an adaptive filter which is adapted to generate an actuating signal supplied to the actuator device for said influence on the vibrations in the vehicle.

14. The device according to claim 1, wherein the reference sensor is connected to the adaptive filter and arranged to supply the reference signal to the adaptive filter, wherein the reference signal forms the basis for the actuating signal.

15. The device according to claim 1, wherein the sensor device is arranged to supply the sensor signal to the adaptive filter for updating the adaptive filer.

16. The device according to claim 13, wherein the control unit includes a prefilter, which is connected to the reference sensor and arranged to provide a filtered reference signal.

17. The device according to claim 13, wherein the control unit includes a control algorithm, which is located between the sensor device and the adapted filer and arranged to filter the sensor signal supplied to the adaptive filter.

18. The device according to claim 16, wherein the prefilter is connected to this control algorithm for the supply of the filtered reference signal to the control algorithm.

19. A device for motor vehicles comprising an engine, a power transmission, and a wheel suspension, comprising:
- a support structure adapted to be mounted in the vehicle,
- a steering wheel rotatably connected to the support structure,
- a control unit,
- a sensor device operatively connected to the control unit, wherein the sensor device comprises at least one sensor adapted to be mounted on the steering wheel and adapted to sense vibrations in the steering wheel and to provide a sensor signal related to the sensed vibrations,
- an actuator device operatively connected to the control unit and adapted to influence vibrations in the vehicle, and
- a reference sensor operatively connected to the control unit and adapted to sense vibrations outside the support structure to provide a reference signal to the control unit, the reference sensor comprising a first reference sensor element adapted to be mounted on at least one of the engine and the power transmission and arranged to sense engine-excited vibrations and a second reference sensor element adapted to be mounted on the wheel suspension and arranged to sense road-excited vibrations,
- wherein the control unit is adapted to control the actuator device, with regard to the sensor signal and the reference signal, to act on the vehicle in such a way that a desired vibration character in the steering wheel is obtained.

20. A motor vehicle, comprising:
- an engine,
- a power transmission,
- a wheel suspension,
- a support structure mounted in the vehicle,
- a steering wheel rotatably connected to the support structure, and
- a device, wherein the device includes
- a control unit,
- a sensor device operatively connected to the control unit, wherein the sensor device comprises at least one sensor mounted on the steering wheel and adapted to sense vibrations in the steering wheel and to provide a sensor signal related to the sensed vibrations,
- an actuator device operatively connected to the control unit and adapted to influence vibrations in the vehicle, and
- a reference sensor operatively connected to the control unit and adapted to sense vibrations outside the support structure to provide a reference signal to the control unit, the reference sensor comprising a first reference sensor element mounted on at least one of the engine and the power transmission and arranged to sense engine-excited vibrations and a second reference sensor element mounted in connection with the wheel suspension and arranged to sense road-excited vibrations,
- wherein the control unit is adapted to control the actuator device, with regard to the sensor signal and the reference signal, to act on the vehicle in such a way that a desired vibration character in the steering wheel is obtained.

\* \* \* \* \*